Dec. 11, 1934.   P. M. MILLER ET AL   1,983,867
VEHICLE WHEEL
Filed Nov. 23, 1931
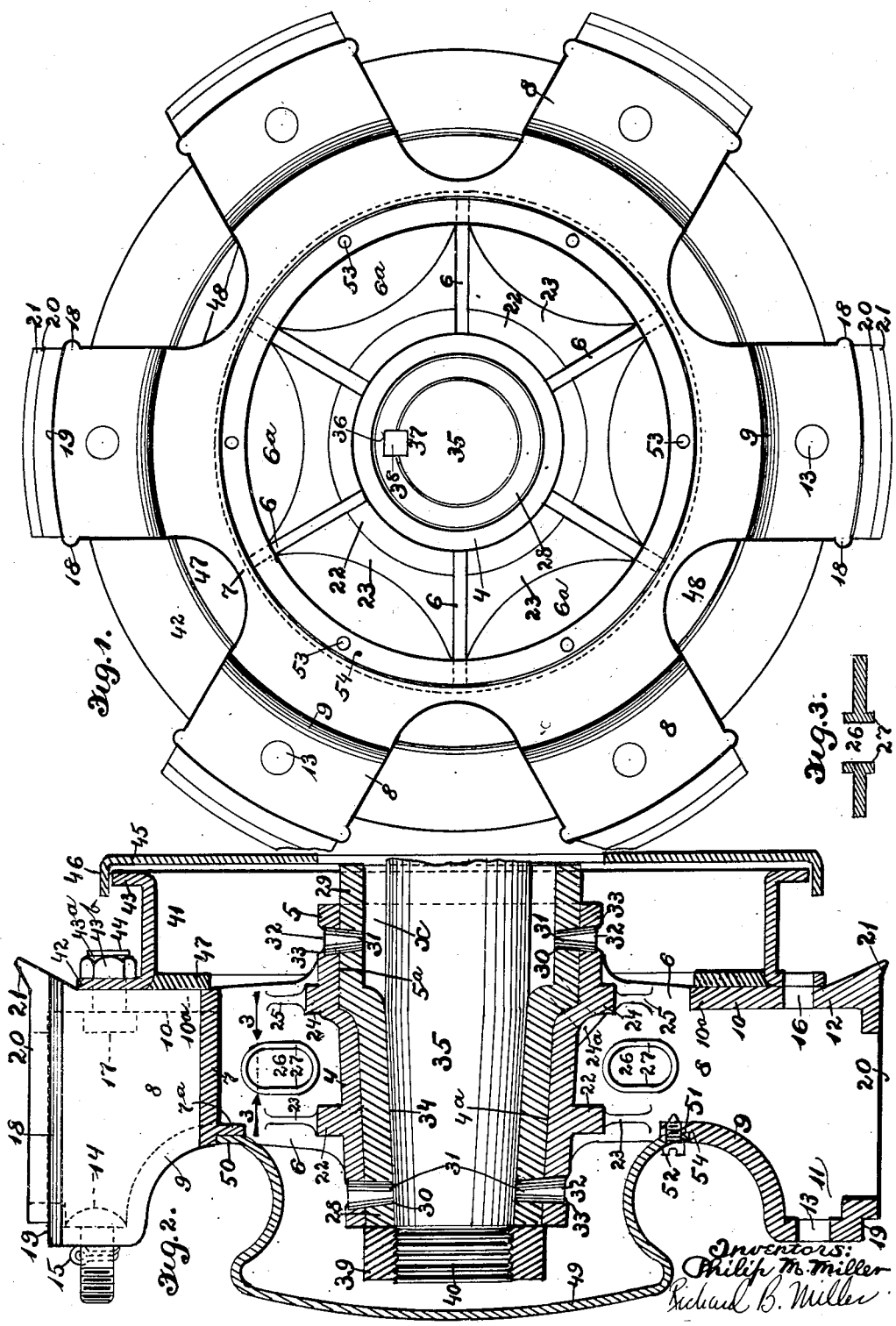

Patented Dec. 11, 1934

1,983,867

UNITED STATES PATENT OFFICE 1,983,867

VEHICLE WHEEL

Philip M. Miller and Richard B. Miller,
Detroit, Mich.

Application November 23, 1931, Serial No. 576,794

1 Claim. (Cl. 287—53)

This invention relates to wheels for motor vehicles and particularly busses, trucks, light or heavy duty vehicles.

The improved wheel herein disclosed embodies features of construction adapted to improve the conventional cast or forged wheels, and to meet manufacturing requirements, certain new and improved features have been devised and incorporated in the present wheel.

It is one of the objects to provide a wheel of the dual type as the rear or driven axle construction, having free spoke ends and carrying a pair of demountable interchangeable tire-rims.

Another object of the invention is that each spoke is cast as an integral unit with the central body of the spider structure, which follows the trend of our improved design, possessing all the advantages of a cast construction and at the same time not being subject to the objections which have in the past been encountered in the manufacture of such wheels, the entire structure being hollow and open throughout, and therefore is light and self-cooling with walls of substantially uniform thickness having curved, arched or flared formations to strengthen the construction and resist uneven shrinkage and formation of cracks or fractures in the natural process of cooling at the foundry; all angles and sharp turns being avoided so that shocks and strains find no acute turns or lines of travel but pass from one part to another along lines which avoid breaking effects and tendencies; reinforcing ribs of a particularly advantageous construction being provided between the hub and spokes and having web and truss members cast integral therewith and at right angles thereto, the ribs, webs and trusses combining to afford the greatest possible bracing action against side and torque thrusts. Around the rib area of the spider structure is provided means for detachably mounting a shell member which prevents ingress of foreign substances into the interior of the body thereof. The inner side wall of the spider structure at the base of the hollow or channeled spokes or in adjacence thereto is provided with means for mounting a brake drum member and the latter may be of the rolled or other type, having the shortest possible attaching flange, and by this construction the periphery of the wheel is desirably strengthened and reinforced by the brake drum. The opposite side walls of the hollow or channeled spokes are advantageously constructed to accommodate the rim-mounting members.

Another object of the invention is to provide a spider structure provided with the shortest possible hollow spokes in order to afford a strong periphery for carrying a heavy vehicle load, and the largest possible central part of the structure in order to decrease weight thereof by means of affording large openings between the members thereof. By means of constructing a large central part it is enabled to form the shortest possible spokes, and the total weight of the spider structure is materially decreased and the strength thereof not minimized.

Another object of the invention is to provide a cast spider structure of malleable iron, comprising the shortest possible hollow or channeled spokes and a central body formed of members which are integrally united by a tubular member forming the central non-driving portion of the wheel structure, in which is rigidly fixed a hard steel hub which forms the driving member. As the entire cast spider structure is of malleable iron, relatively soft for wear in service, the fixed hub member may be of forged steel or other treated material to withstand excessive wear and have a driving connection with the axle shaft of the vehicle.

The various features of novelty and advantage will become apparent in view of the following description taken in conjunction with the drawing, and therein:

Fig. 1 is a side elevation of the wheel construction in accordance with our invention, with the shell removed therefrom;

Fig. 2 is a transverse sectional view of the wheel shown in Fig. 1; and

Fig. 3 is a cross section of Fig. 2 taken on the line 3—3 as indicated by the arrows.

The invention in the form illustrated is designated by corresponding characters referring to parts thereof, in which the spider member comprising the wheel is of arched hollow or channeled self-cooling construction having walls of substantially uniform thickness with the provision for efficient casting. The member binding the inner ends of the parts forming the central portion of the spider structure, comprises a tubular member consisting of an outer tapered portion 4 and an inner cylindrical portion 5 together having correspondingly shaped bores 4a and 5a for the purpose which will hereinafter be described. The ribs 6 are of tapered type and each extends transversely of the spider structure for the greater portion of the length of the tubular members 4 and 5, to obtain the maximum bracing action thereat, and at their outer ends, each of said ribs merges spacedly with an annular transverse wall 7 in the manner to form collectively the openings 6a, and the said annular transverse wall projects radially, outwardly, at spaced points, into merger with upright members together to form the shortest possible spokes 8. Each spoke is hollow with an open end to facilitate casting operations at the foundry and to decrease the weight and cost of production, the front wall 9 being given an annular concave or gutter shape to minimize the consumption of material used in production, while the rear wall 10 is straight to, together with the front wall 9, strengthen the position of the spoke with reference to the spider structure as a whole, and providing by the wall 9 a pocket or recess 11 and by the wall 10 a continuous upright wall 12. In the upright portion of the wall 9 is an opening 13 for securing a bolt 14 which is held engaged by the cotter pin 15 fixed in the opening therein for preventing accidental displacement of said bolt with reference to the wall of the spoke, the head of said bolt being harbored in the pocket 11 and said cotter pin being in contact with the outer face of the wall 9, for the purpose of engagement with a clamping member and a nut for locking tire-rims on the spoke end as described in application, Serial No. 538,020, filed May 18, 1931. In the wall 12 is an opening 16 adapted for securing a bolt 17, for the purpose of which will hereinafter be described. Each side of the upper portion of each spoke end is provided with a laterally extended rib 18, a seat 19 is formed at the outer face of the front wall 9, a transverse bearing seat 20 is provided on the free end of the spoke, which is extended to the formation of an inclined seat 21. When the open space, as shown at the end of each spoke, is closed by one of the spacers (herein not shown but described in the above application) ingress of foreign substances into the interior of the spokes is prevented, and tire-rims which are necessary to complete the wheel construction for service, are mounted thereon in the manner described in that application. Between two of the ribs 6 is a circumferential rib 22 integral with the tubular portion 4 and the web member 23 which fuses into the front sides of the ribs 6, while circumferential ribs 24 are each integral with two of the ribs 6 and the tubular portion 5 and web member 25 which fuses into the rear sides of the ribs 6, thereby collectively to ensure the maximum bracing action, in conjunction with the ribs 6, against torque and side thrust strains imposed thereupon, owing to centrifugal action of the wheel which is in service with a vehicle on the road. Each rib 6 is provided with an opening 26 which is adapted to decrease the weight and cost of production and facilitate foundry operations by the employment of a continuous core in casting the spider structure, instead of the conventional method of using a divided core in the mold. For strengthening the ribs against accidental collapsing, a lip 27 is formed at each face thereof, as clearly shown in Fig. 3, in the manner that the edge defining the opening 26 assumes the shape of a T, by which strength is assured.

We are aware that malleable iron is very much more desirable in the constructing of the tubular members 4 and 5, the members of the central part of the structure, and the spokes, generally, than cast steel, owing to the inherent conditions existing in steel castings by which in actual practice difficulties are encountered in machining the rough surfaces resulted at the foundry operations, as they are necessarily cast heavier than walls of castings formed of malleable iron, as a result of which the steel casting is heavier than malleable iron casting, as well as the cost of production of a steel construction is greatly higher than the cost of producing a malleable iron construction. Malleable iron yields itself more readily to thin nice walls in the castings which can be more readily worked and machined after their formation at the foundry. Thus, with the embodied features of our construction, it is practical to make lighter wheels of malleable iron material and more cheaply than when formed of cast steel. From actual practice we found that difficulty is encountered by using malleable iron for hubs of driving wheels, owing to the walls or faces of an ordinary key-way with which the hubs are provided are insufficiently strong, or dense, to prevent stretching of the malleable material in driving strains and shocks to which the key-way walls are subjected, and therefore, in consequence, it is our intention to form wheels having malleable iron castings for the spokes and central part of the spider structure, comprising the body which binds the ribs, webs, trusses, and the tubular member which binds the inner ends of the ribs, while the hub, that is the driving member, is to be formed of a hard steel forging, specially treated according to the best principles of science known to metallurgy.

As a result of having the main spider structure formed of malleable iron and the hub formed of hard steel specially treated forging, a light, strong, and durable wheel construction is provided.

The hard specially treated forged hub comprises a front or driving portion 28 and a rear or non-driving portion 29, the driving portion being tapered and provided with a tapered bore, while the non-driving portion being cylindrical and provided with a cylindrical bore, for the purpose of which will hereinafter be described. After the spider structure is cast of malleable iron at the foundry, the bore of the tubular members 4 and 5 is machined to the required dimension in the manner to form the front portion tapered and the rear portion cylindrical, as shown. The outer face of the hub members 28 and 29 is suitably ground to form a smooth surface of a diameter larger than the bores 4a and 5a of the tubular members 4 and 5 by an amount suitably to provide a pressed fit in said bores 4a and 5a, after which the hub tapered portion 28 is pressed into the tapered bore portion 4a in the manner that the cylindrical portion 29 of the hub is simultaneously engaged in the cylindrical bore 5a, thereby providing a pressed-fit engagement therebetween to the extent that separation of one from the other is prevented. In order to doubly ensure the pressed fit engagement of the parts, conical openings 30 are provided in the said members 4, 5, 28 and 29, and conical hard steel studs 31 of a diameter larger than the diameter of the conical openings 30 by an amount suitable to provide a pressed fit, are each forced into each conical opening in the manner such that the head 32 thereof is sunk below the surface of the tubular members 4 and 5, and the malleable material is riveted thereover, as shown at 33, to ensure rigid seating of the studs in the conical openings, by which operation both the tubular member and hub being drawn tighter together and studs reinforcing the pressed fit engagement between the members. As is obvious, the tapered portion 28 of the hub forms a rigidly engaged part with the portion 4 of the tubular member, while the cylindrical portion 29 is rigidly engaged with the cylindrical portion 5 of the tubular member and defines an annular space X in the bore therein for seating bearing mechanism of the vehicle, herein not shown, when the bore 34 in the tapered portion 28 of the hub is engaged with the axle or shaft 35 of the vehicle.

For locking the axle in connection with the hub in position as shown, for a driving of the wheel with the vehicle, a key-way 36 is provided in hub portion 28 and a key-way 37 in the axle, and a key member 38 is inserted in the key-ways, as clearly shown in Fig. 1. To ensure the seating of the key member in the key-ways and prevent lateral dislodgement of the axle from the bore 34, a nut 39 is threaded on the end 40 of the axle, to engage with the end of the hub, thereby drawing the axle laterally outwardly into engagement with the bore of the hub.

As is obvious, the conical steel studs 31 may be replaced by other means, such as threading bolts in the openings provided therefor in the portions 4, 5, 28 and 29, or in any other suitable place, to fasten the parts together for driving the spider structure with the axle of the vehicle. We may also fasten the hub in the tubular members 4 and 5 by means of having the forged hub cast integral with the tubular member and the other parts of the structure, at the foundry operations, and, if desired, employ additionally the other hereinbefore described means of fastening.

The advantage of having a hard specially treated steel hub engaged in the tubular binding malleable member for a practical driving with the axle of the vehicle lies in the combination thereof, that is the fastening of one with the other in any suitable manner, to form a rigid non-separable engagement therebetween, as any form of means may be adopted to accomplish the result of combining the members as one unit.

The particular advantage of having a hard specially treated forged hub is obvious by the fact that excessive wear is obtainable therefrom in comparison to the short wear obtained by the use of malleable iron hubs for driving with an axle of a vehicle.

It is therefore our intention to provide a cast spider structure of malleable iron and a hub of hard forged steel material, by which combination a strong, light and durable construction is obtainable.

In connection with the foregoing it should be understood that the hub may be made of any suitable hard wear resisting material which is different than the material of the spider structure, and that the fastening of the hub with the tubular members 4 and 5 may be accomplished by the bolts or studs 24a positioned in openings provided at the junction of the portion which unites the respective members 4, 5, 28 and 29 to constitute integral members, as shown. The novelty of the invention is attained not in the means of fastening the members together as a distinctive feature, but in combination with the method of fastening and the construction of the hub and tubular member which binds the parts into an integral structure. The condition of providing a malleable wheel structure useful as a driving member of a vehicle presents an advantage over the conventional malleable wheel which is not provided with a hard specially treated forged hub and is not useful in service as a driving wheel of the vehicle.

Extending radially, inwardly, is an angular flange 7a integral with the inner portion of the outboard side of the annular body 7, in parallel and confluent alignment with the outer portions of the ribs 6, and an annular flange or wall 10a integral with the inner portion of the inboard side of the annular body 7, in parallel and confluent alignment with the outer portions of the ribs 6, to form means whereby the structural members of the spider structure are braced to provide a cantilever construction for sustaining the greatest possible torque and side thrust strains exerted thereagainst in any manner of service of the wheel.

As is obvious, the brake drum member 41 may be of U-shape channel in cross section, having its attaching flange 42 engaged with the upper portion of the wall 10. The projection 43a of the bolt 17 is passed through an opening in the flange 42 and threadedly engaged with a nut 43b, upon which the projection is peened as at 44, to form an inseparable engagement therebetween. The upright flange 43 of the brake drum is telescoped by the backing plate 45 having its transverse flange 46 overhanging the flange 43, to close off the interior of the brake drum, whereby ingress of foreign substances into the interior of the construction is prevented and a housing is provided for harboring braking mechanism. To further prevent ingress of foreign substances into the interior of the spider structure between the inner ends of the spokes, an annular member 47 is extended from the inner portion of the attaching flange 42 of the brake drum and is engaged with the inner sides of the spokes and annular wall 10a, thereby closing the openings 48, shown in Fig. 1.

The engagement of the brake drum at a remote distance from the center of the wheel and in close proximity to the point which is nearer to the periphery of the wheel, is objectively provided to stiffen the spoke construction with reference to the central part thereof, in contradistinction to engagement of brake drums of the conventional type with or adjacent to the hubs of vehicles.

In order to close off the central part of the spider construction for preventing ingress of extraneous substances into the interior thereof, a shell 49 is provided with a side flange 50 which is seated in the depression 51 formed in the body 7a. Fillister screws 52 are employed, which are passed and engaged with threaded openings 54 in the flange 50 and body 7a, whereby the shell is fastened to the annular body 7a.

As is obvious, the wheel construction as a whole is well protected against entrance of undesirable substances into the interior thereof, and the structure as described is ready, in connection with tire-rims, for service with a vehicle.

From the foregoing description and the disclosure of the construction it is obvious that we are enabled to construct a wheel proper of suitable composition of material to constitute, in view of the incorporated features therein, a light, neat, self-cooling, strong, and durable spider structure, and a hard high wear resisting hub of suitable material, which is easily inserted into the central ring member which binds the inner ends of the central members of the spider structure into a solid body, and the engaged members are rigidly fastened together to form means adapted for a driving connection with the axle of the rear housing of a vehicle and enclosing bearing means in the inner part thereof for operating with means of the vehicle.

As is obvious, the malleable central tubular member of the central part of the spider structure is pressed fit with the hard resisting hub and additionally fastened together by locking means, both said members collectively form one unit, by which the members of the central part of the structure are held together and supported so that, in the manner as disclosed, the concrete central part thereof is rigidly supporting the peripheral spokes for sustaining load.

Owing to the particular embodiments of construction we are enabled to accomplish the objects of the invention, and provide the shortest possible hollow spokes and the largest possible central self-cooling structural part, by which the periphery of the structure is desirably stiffened and the central part considerably lightened, without decreasing the strength necessary to carry load. The total cost of production is greatly reduced, and the exterior of the wheel as a whole simulates the appearance of the artillery type of wheel.

We are aware that modifications, variations and substitutions can be made without departing from the spirit and scope of the claim, and therefore, we broadly claim our invention as new and novel by the following.

We claim:

In a metal wheel for motor vehicles, the combination comprising a spider member of malleable metal formed with a central tubular portion, a hub proper of relatively hard wear-resisting metal inserted in said tubular portion, tapered studs of hardened metal having a pressed fit in openings formed in said tubular portion and hub for locking them in inseparable relation, the metal of the tubular portion being headed over the top of the studs to ensure against loosening of the latter.

PHILIP M. MILLER.
RICHARD B. MILLER.